US008208469B2

(12) United States Patent
Tochio

(10) Patent No.: US 8,208,469 B2
(45) Date of Patent: Jun. 26, 2012

(54) COMMUNICATION SYSTEM AND APPARATUS

(75) Inventor: Yuji Tochio, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 302 days.

(21) Appl. No.: 12/558,009

(22) Filed: Sep. 11, 2009

(65) Prior Publication Data

US 2010/0002706 A1  Jan. 7, 2010

Related U.S. Application Data

(63) Continuation of application No. PCT/JP2007/000322, filed on Mar. 28, 2007.

(51) Int. Cl.
H04L 12/56 (2006.01)
(52) U.S. Cl. .................. 370/392; 370/401; 370/469
(58) Field of Classification Search .................. None
See application file for complete search history.

(56) References Cited

U.S. PATENT DOCUMENTS

| 2005/0089047 | A1 | 4/2005 | Ould-Brahim et al. | |
| 2005/0129059 | A1* | 6/2005 | Jiang et al. | 370/466 |
| 2007/0030851 | A1 | 2/2007 | Sinicrope et al. | |
| 2008/0037526 | A1* | 2/2008 | Dong | 370/352 |
| 2009/0296568 | A1* | 12/2009 | Kitada | 370/221 |
| 2010/0189115 | A1* | 7/2010 | Kitada | 370/400 |

FOREIGN PATENT DOCUMENTS

| JP | 2004-312152 | 11/2004 |
| JP | 2005-244470 | 9/2005 |

OTHER PUBLICATIONS

Supplementary European Search Report dated May 2, 2011, from corresponding European Application No. 07 73 6979.1.
L Martini, Ed., et al. "Pseudowire Setup and Maintenance Using the Label Distribution Protocol (LDP)", IETF Standard, Internet Engineering Task Force, Apr. 1, 2006.
D. Zelig, Ed., et al. "Pseudo-Wire (PW) over MPLS PSN Management Information Base: draft-ietf-pwe3-pw-mpls-mib-11" IETF Standard-Working-Draft, Internet Engineering Task Force, vol. pwe3, No. 11, Feb. 26, 2007.
Supplementary European Search Report dated May 2, 2011, from corresponding European Application No. 07 73 6979.
L. Martini, Ed., et al. "Pseudowire Setup and Maintenance Using the Label Distribution Protocol (LDP)", IETF Standard, Internet Engineering Task Force, Apr. 1, 2006.

(Continued)

Primary Examiner — Robert Scheibel
Assistant Examiner — Duc Duong
(74) Attorney, Agent, or Firm — Katten Muchin Rosenman LLP

(57) ABSTRACT

A system that allows information of MPLS layers to be reported to PW layers by providing a function having a correlation between MPLS layers and PW layers. A PE uses MPLS (Multi-Protocol Label Switching) tunneling and label technology to map a communication service to MPLS, thereby providing bidirectional services on an end-to-end basis. a communication system comprising the PE to perform label assignment control for bidirectional services, the PE to transmit, after completion of assignment control, a message in which the LDP message used in assignment control is a payload and a tunnel-directed label (L2) used by bidirectional services is a header and the PE to associate, on the basis of the received LDP message used in assignment control, a service-directed label (P1) included in the LDP message with the received tunnel-directed label (L2) in the part where the message is terminated.

15 Claims, 18 Drawing Sheets

OTHER PUBLICATIONS

International Search Report, dated Apr. 24, 2007 for corresponding International Application PCT/JP2007/000322.

Rahul Aggarwal, "OAM mechanisms in MPLS layer 2 transport networks" IEEE Communications Magazine, Oct. 2004, pp. 124-130, <URL: http://ieeexplore.ieee.org/iel5/35/29548/01341270./pdf>.

Thomas D. Nadeau, et al., "Pseudo wire virtual circuit connectivity verification (VCCV)", Mar. 5, 2007, pp. 1-28, <URL: http://www.watersprings.org/pub/id/draft-ietf-pwe3-vccv-13.txt>.

Thomas D. Nadeau, et al., "Pseudo wire (pw) OAM message mapping", Mar. 6, 2007, pp. 1-30, <URL:http://www.watersprings.org/pub/id/draft-ietf-pwe3-oam-msg-map-05.txt>.

Communication dated Apr. 11, 2012 from corresponding EP 07 736 979.1.

* cited by examiner

| input | Output (LABEL) |
|---|---|
| (2) L2 (LABEL) OR LSP2 + PW label BELONGING TO LSP2 | P1-1~P1-n |
| (1) LDP MESSAGE WHICH IS INPUT BASED ON IP (WITH P1 MAP REQUEST) | (P1-1~P1-n ARE KNOWN, CORRESPONDING LSP EQUIVALENT (L1) IS) (0) |

FIG. 6B

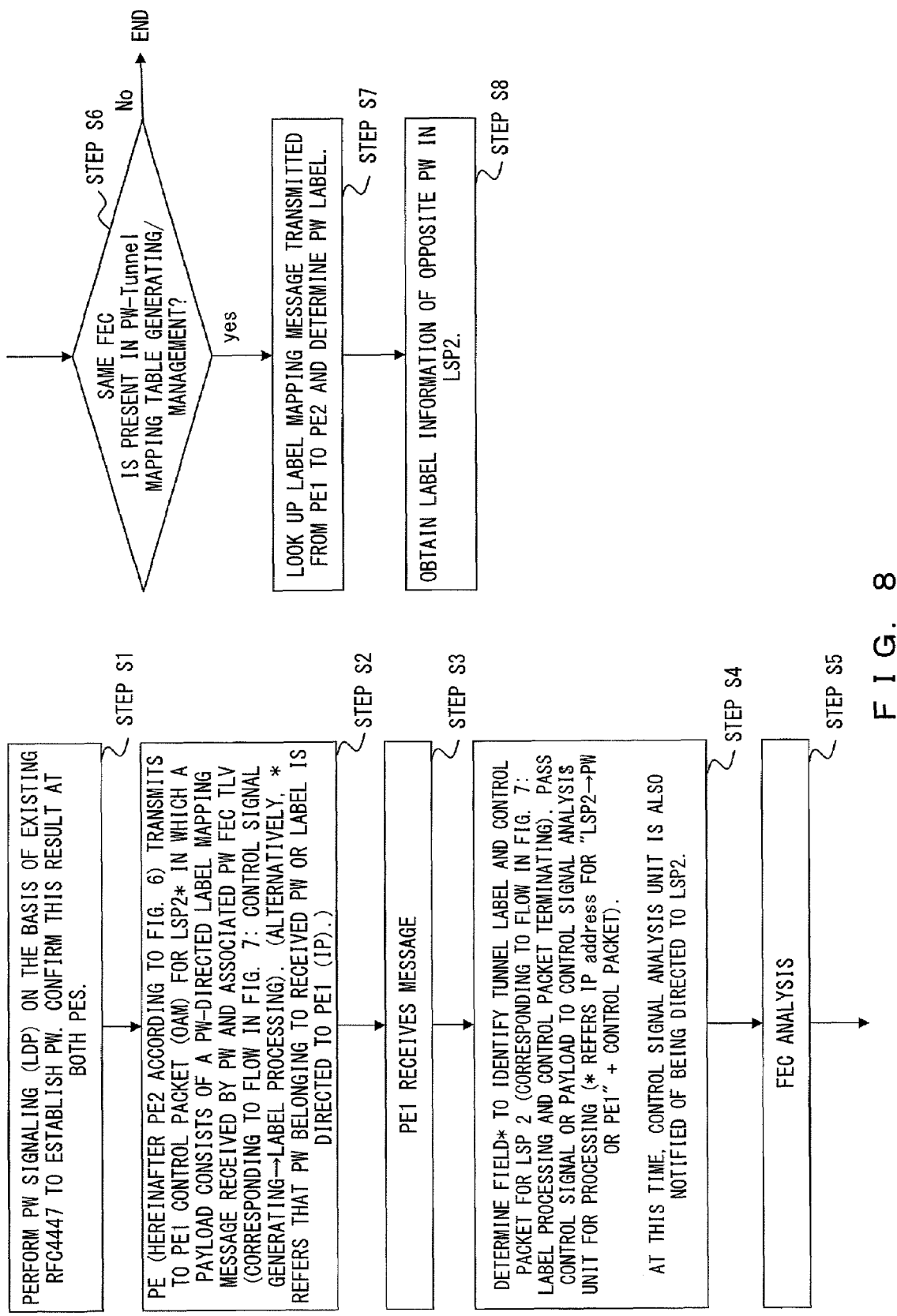
F I G. 8

SEND ALARM ABOUT FAILURE IN LSP2. SPECIFICALLY, RECEIVE FDI AT PE1. PASS TO CONTROL SIGNAL ANALYSIS UNIT VIA LABEL PROCESSING UNIT AND CONTROL PACKET TERMINATING UNIT (FIG. 7).
— STEP S10

ACCORDING TO CLAIM 1 (FIG. 6), OBTAIN OPPOSITE PW INFORMATION (LABEL INFORMATION) FROM PW-Tunnel MAPPING TABLE (FIG. 7) WITH REFERENCE TO LSP INFORMATION.
— STEP S11

GENERATE BDI message CORRESPONDING TO OBTAINED PW LABEL (PW) AT CONTROL SIGNAL GENERATING UNIT (FIG. 7).
— STEP S12

TRANSMIT TO PE2 FOR EACH PW UNIT.
— STEP S13

F I G. 9

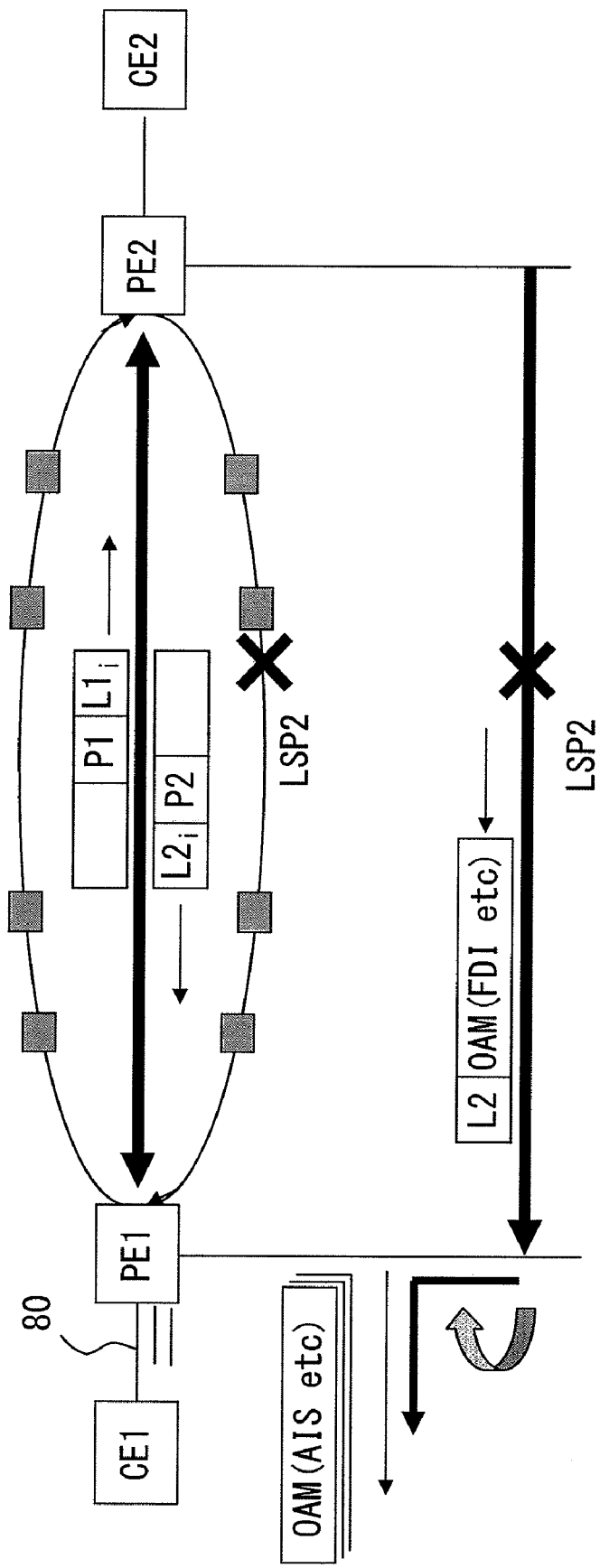
F I G. 10A

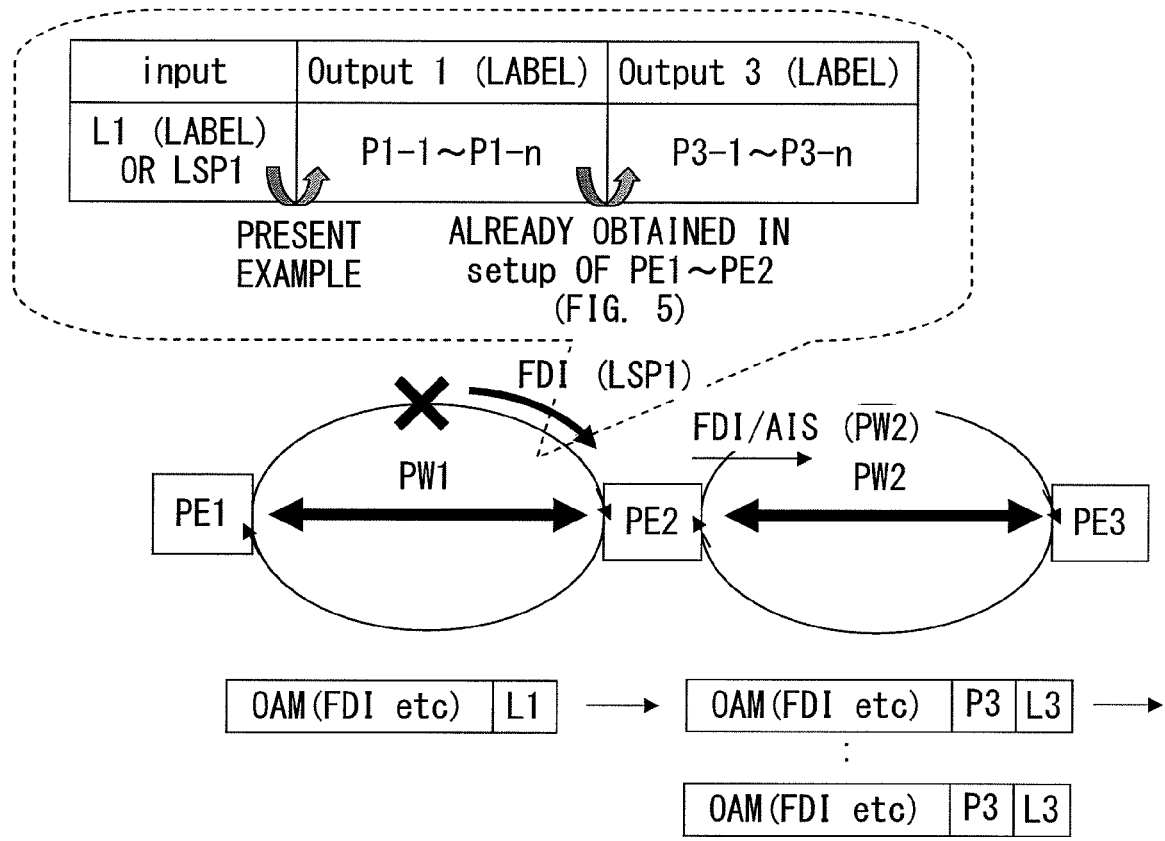
F I G. 10C

COMMUNICATION SYSTEM AND APPARATUS

CROSS REFERENCE TO RELATED APPLICATIONS

This application is a continuation application of International PCT Application No. PCT/JP2007/000322, filed on Mar. 28, 2007.

FIELD

The embodiments discussed herein are related to technology which provides a telecommunication service using MPLS (Multi Protocol Label Switching), and are specifically related to a communication system which provides redundancy.

BACKGROUND

Recently, MPLS has received a lot of attention as packet transmission technology. The IETF (Internet Engineering Task Force) is promoting specification study and standardization of PWE3 (Pseudo Wire Emulation Edge-to-Edge), which provides existing services (such as FR (Frame Relay), ATM, TDM, and Ethernet) on an end-to-end (point-to-point) basis utilizing MPLS as tunneling technology. From the standpoint of service integration, Pseudo Wire (PW) technology utilizing MPLS is expected to expand into carrier networks and will require further higher reliability in the future.

FIG. 1 illustrates a model diagram of PWE3 defined by IETF (RFC (Request For Comments) 3915, 3986). FIG. 1 illustrates a PSN (Packet Switched Network) 1 in which a PSN tunnel 2 and Pseudo Wire PW are established between provider edges PE1 and PE2. In the Pseudo Wire PW, PW1 and PW2 are established in correspondence with customer services, for example. The provider edge PE1 is connected to a customer edge CE1 outside the Pseudo Wire PW via an attachment circuit 3, and the provider edge PE2 is similarly connected to a customer edge CE2 outside the Pseudo Wire PW via an attachment circuit 4.

Here, an end-to-end service 5 (such as Ethernet, ATM, Frame Relay, TDM, and PPP/HDLC) is emulated using a packet network. As technology which provides virtual pipes (tunnels), MPLS and L2TP (Layer 2 Tunneling Protocol) are mainly used.

In carrier networks, high reliability must be ensured. As an example, it is important to construct efficiency-focused connection management technology, and a mechanism in which for example a single failure in a network does not become a load on end users is required.

ITU-T Recommendation Y.1731, which specifies carrier Ethernet OAM (Operation, Administration, and Maintenance) has realized a mechanism considering the above. The specific configuration is illustrated in FIGS. 2A, 2B, and 2C. In the Ethernet service illustrated in FIGS. 2A and 2B (i.e., a service to aggregate traffic between CE1-[1, 2, . . . , n] CE2-[1, 2, . . . , n] at PE1 and PE2), Y.1731 specifies that a provider layer OAM management domain be provided in a provider domain PE1-PE2, and also that a customer layer OAM management domain be provided in a CE domain, and this customer domain is set in a manner that overlays the provider domain. FIG. 2B illustrates a case in which this system has a hierarchical structure including a customer layer 21 and a provider layer 22.

In this case, alarm forwarding when a single failure occurs in the provider management domain 22 between PE1-PE2 is performed in a manner such that an apparatus at the failure end generates an AIS (Alarm Indication Signal), detects LOC (Loss of Continuity), and notifies PE1 and PE2 of the AIS. Receiving this notice triggers PE1 and PE2 to generate an AIS notice for the customer domain and deliver it to the end point. On receiving the AIS, an alarm inhibit function operates to inhibit LOC detection, and at the same time a failure in the service domain may be detected and recognized.

FIG. 2C illustrates a case in which there is no hierarchical structure. While a failure in the service domain may be detected by not receiving a CC (Connectivity Check) transmitted from the customer device, receiving no CC may be detected in principle with a time-out of a timer having a length several times longer than a transmission interval. Therefore the detection time is estimated to be much longer than that in FIG. 2B. While reducing the detection time may be achieved by speeding up (shortening) the CC cycle, in that case, not only might bandwidth in the provider be suppressed, but also processing at PEs may be burdened with a load.

As described above, layer management in a packet network is important to achieving flexible connection management for each customer. Considering the above, it is necessary to construct layers such those as illustrated in FIG. 3 in PW/MPLS also, and based on that, a mechanism for providing OAM, connection management, and failure notification is required. Specifically, the service layer 31 corresponds to the customer layer 21, and the Pseudo Wire (PW) layer 32 and the MPLS layers 33 and 34 correspond to the provider layer 22. Packets consisting of L2 and OAM (FDI, etc.), and packets consisting of L1, P1, and OAM (BDI, etc.) are bidirectionally transmitted from PE2 to PE1, and from PE1 to PE2, respectively. When a failure is reported/detected in the MPLS layer 34, escalation to the PW layer 32 and the service layer 31 is required. In other words, since each layer is independent of the others, it is necessary to perform LOC detection by timing out for each PW unit at PE1. Even in the case of a failure in the MPLS LSP (Label Switching Path), there is no mechanism to notify the PW layer 32 of an alarm, and as a result, a failure is detected by Loss Detection (timer-dependent) which may be not only time-consuming, but also complicated since one-to-one processing is performed for each PW.

In addition, it is necessary to insert flags equivalent to RDI (Remote Defect Indication) on the opposite part. Unlike what is illustrated in FIGS. 2B and 2C, the MPLS layers 33 and 34 existing under the PW layer 32 have two unidirectional paths. Therefore it is necessary to assume a unidirectional failure and thus that RDI is a necessary function. Consequently, this optional function to insert the RDI is further required. In the MPLS layers 33 and 34, communication is performed through tunnels 35 and 36.

Considering the above, processing for each PW becomes complicated as in FIG. 2B in the PW/MPLS above. And as was described in the beginning, it is desirable that PE1 be notified of a failure on the basis of a single failure occurring below the MPLS layer, and then RDI may be generated. However, this has not been achieved satisfactorily with the current framework. Specifically, escalation to the PW layer 32 and the service layer 31 cannot be achieved when a failure is notified/detected in the MPLS layers 33 and 34.

This situation is illustrated more specifically in FIG. 4. OAM, which is equivalent to AIS occurring in a lower layer of PW (ITU-T Y.1711 FDI, for example), is received at PE1. PE1 needs to extract labels P1-1~P1-$n$ to identify opposite customer services with L2 or LSP2 (MPLS label) to identify this AIS equivalent OAM.

However, the current framework of signaling (label distribution) is independent for each layer (MPLS, PW). Practically, RSVP-TE defined in RFC3209 or LDP (Label Distribution Protocol) defined in RFC3036 are used in MPLS, and LDP defined in RFC4447 (RFC3036) is used in PW. These are performed in independent procedures based on IP (Internet Protocol). In other words, there is a possibility that a signal for signaling or a label mapping message may not be transmitted on the MPLS tunnel in a configuration of PW, and thus the opposite labels of the tunnel-directed label L2 or the customer service identification labels P1-1~P1-$n$ may not be extracted.

While patent document 1 discloses alarm forwarding in a network, it is different from embodiments of the present invention in that a wavelength is used in a unidirectional link.
Patent Document 1: Japanese Laid-open Patent Publication No. 2004-312152

SUMMARY

An embodiment of the present invention provides a management system of labels and paths applied to a communication apparatus using PW (Pseudo Wire) technology on the basis of MPLS. It allows an LOC function from the lower layers (below MPLS) to be reported (escalated) to PW by providing a function having a correlation between MPLS (layers) and PW (layers), and is characterized by its efficient failure notification. Practically, such function is achieved by extending PW signaling.

The first aspect of the present invention provides a communication system which is a transmission system using MPLS (Multi Protocol Label Switching) tunneling and label technology to map a communication service to the MPLS and to provide bidirectional services on an end-to-end basis. The communication system is characterized by including a means to perform label assignment control for the bidirectional services; a means to transmit, after completion of the assignment control, a message in which an LDP message used in the assignment control is a payload and a tunnel-directed label (L2) used by the bidirectional services is a header; and a means to associate, on the basis of the received LDP message used in the assignment control, a service-directed label (P1) included in the corresponding LDP message with the received tunnel-directed label (L2), in the part where the message is terminated.

This allows the customer service label P1 from the first edge to the second edge to be associated with the customer service label P2 from the second edge to the first edge in MPLS bidirectional communication system. Therefore, the tunnel label L2 in a certain direction in the MPLS layer may be escalated to the customer service identification label P2 in the certain direction in the PW service layer, to the customer service label P1 in the opposite direction, and to the tunnel label L1 in the opposite direction.

The second aspect of the present invention provides a communication system to perform the bidirectional communication services of the first aspect, and is characterized in that the means to associate includes a means to analyze the message to determine the presence of a message having the same Forwarding Equivalence Class (FEC) or the same forwarding attribute in the label assignment; and a means to look up labels (P1-1~P1-$n$) transmitted from the first end to the second end which identify the customer service, and to detect corresponding labels (P2-1~P2-$n$) transmitted from the second end to the first end which identify the customer service.

The third aspect of the present invention provides a communication system according to the first aspect of the present invention, and is characterized in that the header of the message includes a specific label for control management.

The fourth aspect of the present invention provides a communication system according to the first aspect of the present invention, and is characterized in that the header of the message includes a specific data field for control management.

The fifth aspect of the present invention provides a communication system according to the first aspect of the present invention, and is characterized in that the header of the message includes IP and UDP.

The sixth aspect of the present invention provides a communication system according to any of the first to fifth aspects of the present invention, and is characterized in that, when receiving a failure notification message in which a tunnel-directed label used by a service is a header, a service-directed label in the opposite direction is obtained, and a payload associated with the obtained service-directed label reflects that a service using a tunnel to which the received failure notification message belongs is in a disconnection state.

This allows correspondence between labels L2 and P1-$n$, for example to transmit data including the label L2 and OAM (FDI, etc.) from the provider edge PE2 to the provider edge PE1, and to transmit data including the label L1, label P1-$n$, and OAM (RDI, etc.) from the edge PE1 to the second edge PE2 for failure notification. In other words, if a failure occurs in a path toward one provider edge PE1, a packet having the label L2 and the customer service identification label P2 as management codes followed by management data is transmitted to notify PE1 of the failure. Then PE1 may transmit data having the label L1 and the customer service identification label P1 as management information to the other provider edge PE2 through a path without a failure.

The seventh aspect of the present invention provides a communication system according to any of the first to fifth aspects of the present invention, and is characterized in that, when receiving a failure notification message in which a tunnel-directed label used by a service is a header, a corresponding service-directed label or a service identification is obtained from the header, and the user is notified of a disconnection state of the service.

The eighth aspect of the present invention provides a communication system according to any of the first to fifth aspects of the present invention; it is a failure notification system at an MPLS path endpoint and a connecting point in a transmission system. The transmission system connects paths in tandem formed by mapping to MPLS and provides bidirectional services on an end-to-end basis. The communication system is characterized in that when the MPLS path endpoint and the connecting point receive the failure notification message in which a tunnel-directed label used by a customer service is a header, a service-directed label in the forward direction is obtained from the header, and a disconnection state of the service is reflected in a payload associated with the obtained service-directed label.

The ninth aspect of the present invention provides a communication system according to any of the first to fifth aspects of the present invention, and is characterized in that, when the means to associate, on the basis of the received message used in the assignment control, associates the service-directed label included in the corresponding message with the received tunnel-directed label, if it is determined that all service-directed labels included in the corresponding message are present in a single tunnel which holds an opposite service, then the tunnel is notified that a service using a tunnel to which the received failure notification message belongs is in a disconnection state.

The tenth aspect of the present invention provides a communication system which is used in a transmission system to use MPLS (Multi Protocol Label Switching) tunneling and label technology to map a communication service to the MPLS and to provide bidirectional services on an end-to-end basis. The communication system is characterized by including a means to perform label assignment control for the bidirectional services; a means to receive, after completion of the assignment control, a message in which a message used in the assignment control is a payload and a tunnel-directed label used by the bidirectional services is a header; and a means to associate, on the basis of the received message used in the assignment control, a service-directed label included in the corresponding message with the received tunnel-directed label.

BRIEF DESCRIPTION OF DRAWINGS

FIG. 6B is a schematic diagram illustrating a processing of an embodiment of the present invention;

FIG. 8 is an apparatus block diagram of the first example of the present invention;

FIG. 9 is a diagram illustrating operations in the first example of the present invention with reference to FIGS. 6A, 6B, 6C, and 7;

FIG. 10A is a schematic diagram of the second example of the present invention;

FIG. 10C is a schematic diagram of the third example of the present invention;

DESCRIPTION OF EMBODIMENTS

Example 1

Figure 5:
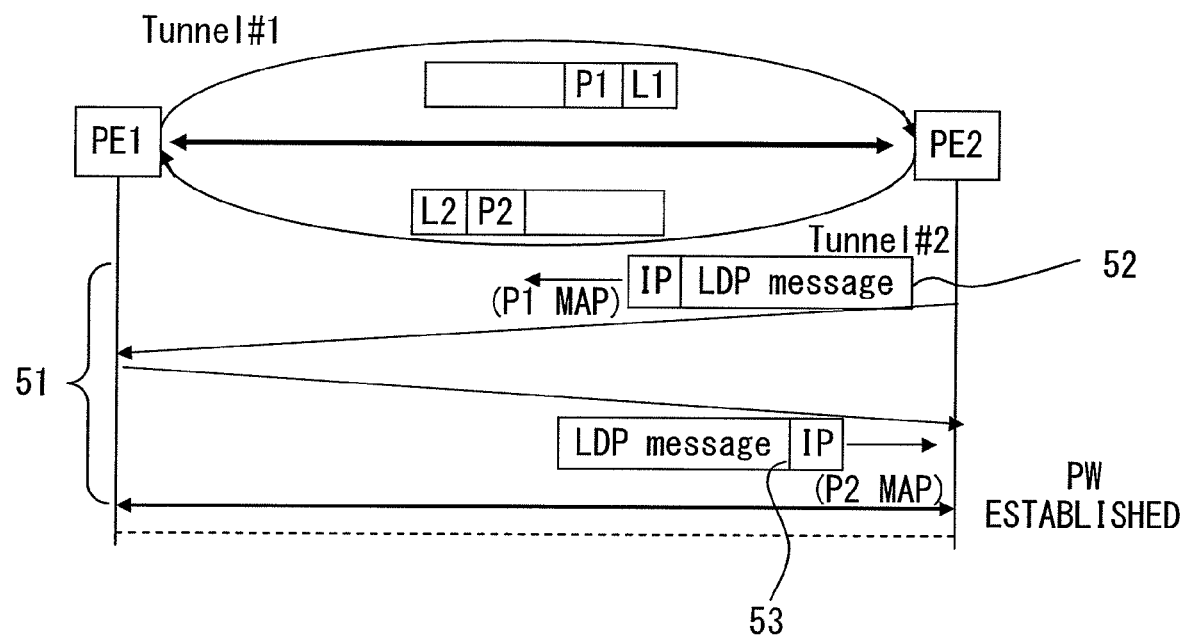
FIG. 5 is a diagram to illustrate a first example of the present invention.

An example of the present invention is illustrated in FIGS. 5 and 6. FIG. 5 illustrates that assignment of PW labels is determined based on RFC4447. In PW layer 51, an LDP message 52 to request P1 is transmitted from PE2 to PE1, and in the opposite direction, an LDP message 53 to request P2 is transmitted from PE1 to PE2. In this way, PW signaling is established. At this time, the LDP message following the IP header has a common element in signaling in both directions except for only a requested label, such as an IP address in FIG. 5.

Figure 6A:
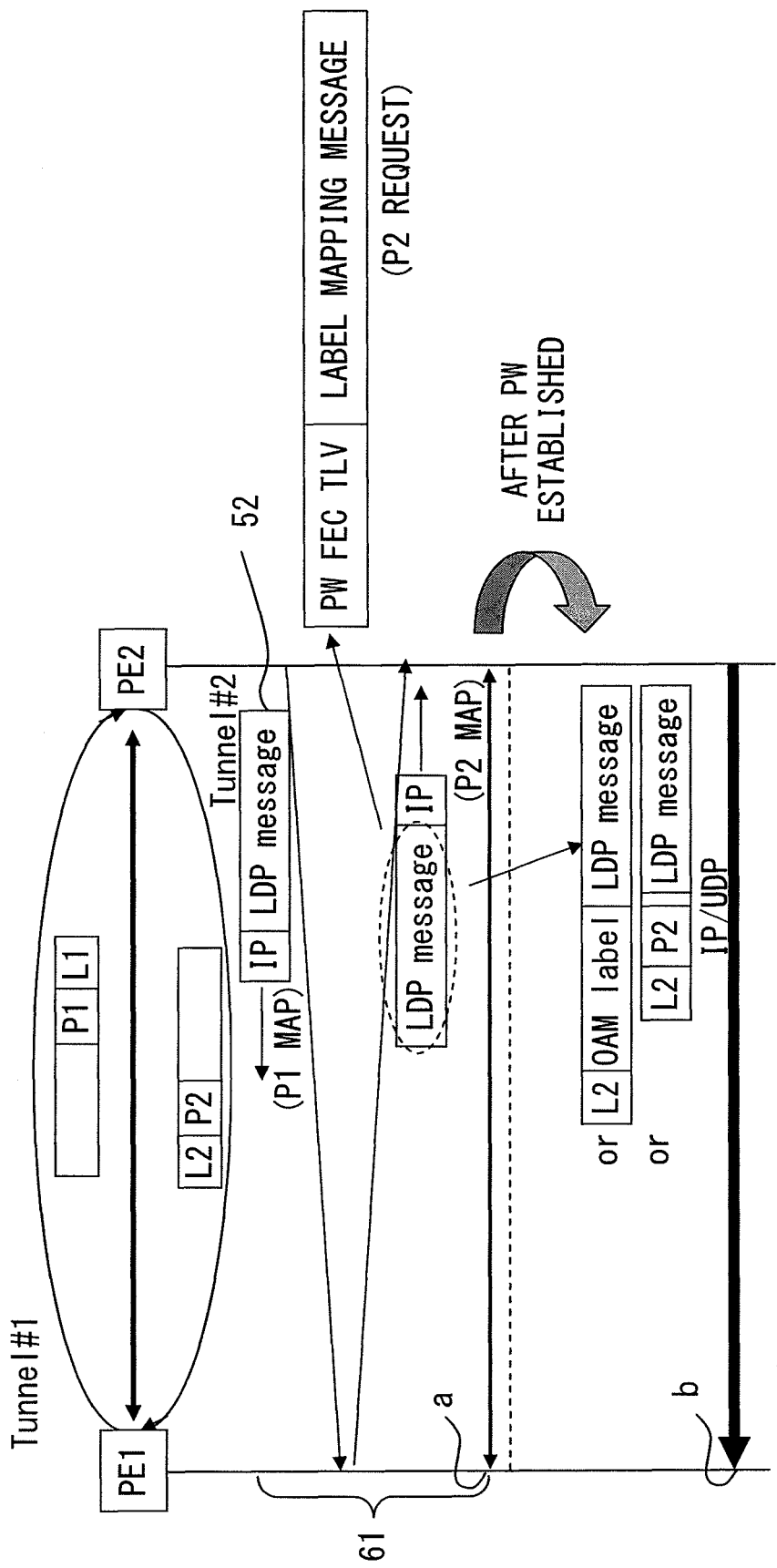
FIG. 6A is a schematic diagram illustrating a processing of an embodiment of the present invention.

As illustrated in FIG. 6A, once PW signaling is established, PE2 directs the P2-mapped LDP message directly toward a tunnel #2 (PE2->PE1) and transmits a control message having this LDP message as a PDU (Protocol Data Unit). At a receiving end, or at PE1, correlation between L2 and P2 may be obtained in a control processing unit within an apparatus. As described in detail below, correspondence between P2 and P1 may be obtained in the signaling stage according to a method of an embodiment of the present invention, and practically correlation between L2 and P1 is obtained in the map information in IP-based signaling. Here, a format of the LDP message includes the following:

PW FEC TLV (common in both directions)+label
mapping message TLV (P1 or P2)

where FEC: Forwarding Equivalence Class; and TLV: Type, Length, and Value

Forwarding Equivalence Class (FEC) refers to a group of IP packets to be transmitted in the same manner, for example such as in the case of transmitting the same paths in the same forwarding processing. A label identifies the FEC. Specifically, FEC represents a message having the same forwarding attribute in label assignment. Correspondence between P1 and P2 is obtained on the basis of the LDP massage stored in PE1 and the LDP message transmitted from PE2 to PE1. This correspondence is illustrated in FIG. 6B and in the relationship between input (tunnel label) and output (PW) in FIG. 6C.

Figure 6C:
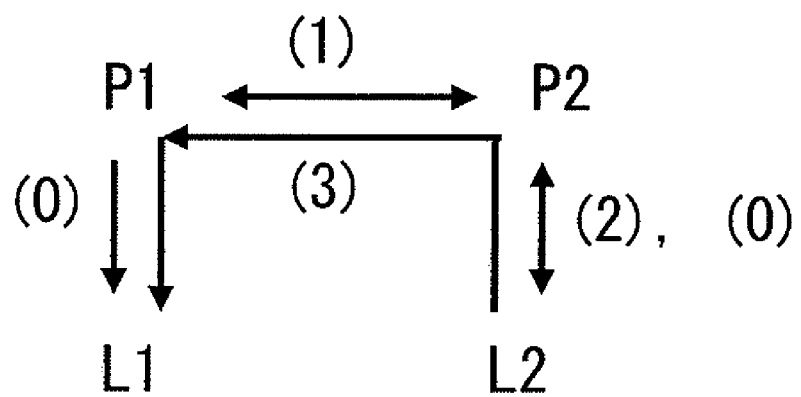
FIG. 6C is a schematic diagram illustrating a processing of an embodiment of the present invention.

Now reference is made to FIGS. 6A, 6B, and 6C for more detailed explanation. First, the LDP message from PE2 (label message to request PW FEC and P1) is stored at point "a" in the PW layer (FIG. 6A) when PW is established. Next, the following processing is executed at point "b" (FIG. 6A) after PW is established. Here, (0) to (3) described below correspond to the same reference numbers in FIGS. 6B and 6C.

(0) if PE1 maps P1 when PW is established as described above, it is already known that the destination is PE2, and thus it is recognized that L1 is to be mapped in front of P1. In other words, once P1-1~P1-$n$ are known, an L1 equivalent to the corresponding LSP (Label Switched Path) may be referable.

(1) PW FEC TLV of the LDP message (with P1 map request) which is input on the basis of IP is decoded. Because they have this LDP message in common, the message which requested P1 in the signaling stage from PE2 to PE1 is associated with the received message which requested P2, and thus correspondence between P1 and P2 is obtained.

(2) Correspondence between L2 (with control message ID) and P2 is obtained. In other words, "L2 (label) or LSP2+PW label belonging to LSP2" is received.

(3) Therefore, with reference to L2, P1 and thus L1 is associated with L2. Specifically, with reference to the received (input) LDP message which is input on the basis of IP, correspondence between P1 stored in PE1 and the received (input) L2-labeled P2 is obtained on the basis of having the same LDP message. Consequently, correspondence between P2 and P1, and thus correspondence between L2 and P1 (output), are obtained.

A control message may be achieved, for example by using an OAM label of Y.1711 as a header and assigning this message as PDU. Although Y.1711 does not specify this function, such processing may be executed with a function type.

A control message may also be transmitted with an OAM header and an IP/UDP header assigned. In this case, termination may be achieved by setting IP=127.0.0.0 in IP control.

The header has a packet structure which includes L2, OAM and an LDP message in this order.

Figure 1:
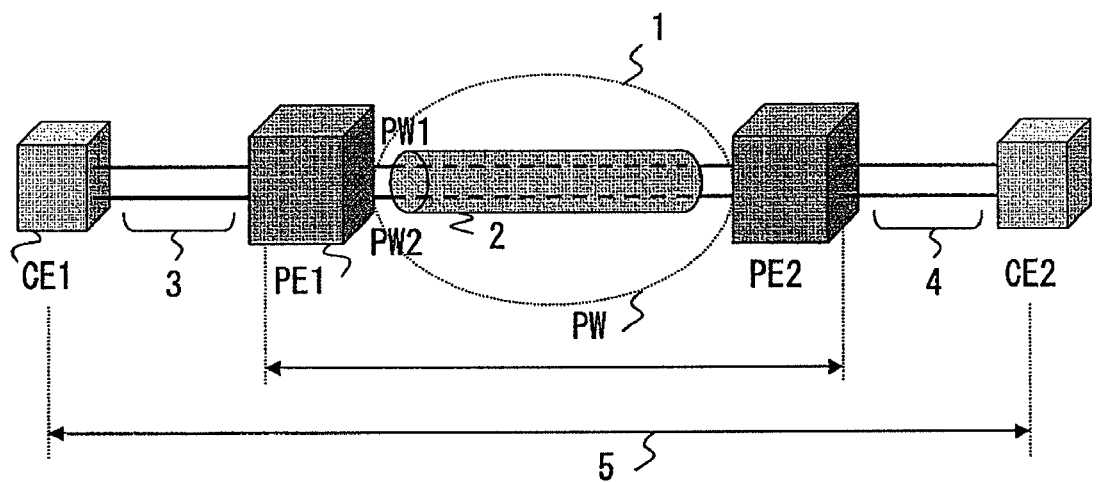
FIG. 1 is a model diagram of PW based on RFC3915 in the prior art.
Figure 2:
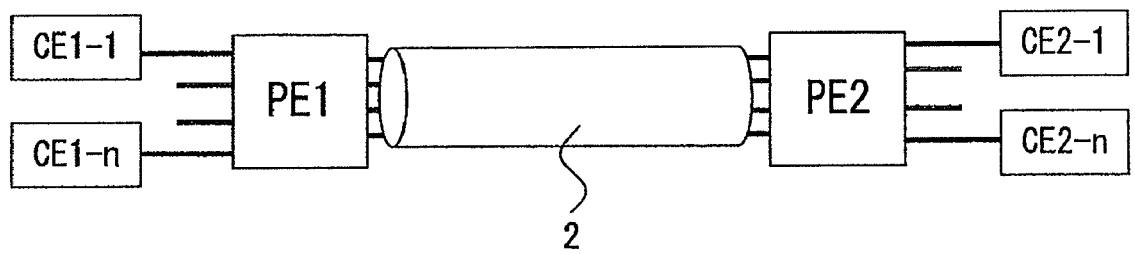
FIG. 2A illustrates a prior art and an OAM structure adopted in Y.1731.
FIG. 2B illustrates a prior art and an OAM structure adopted in Y.1731.
FIG. 2C illustrates a prior art and an OAM structure adopted in Y.1731.
Figure 2B:
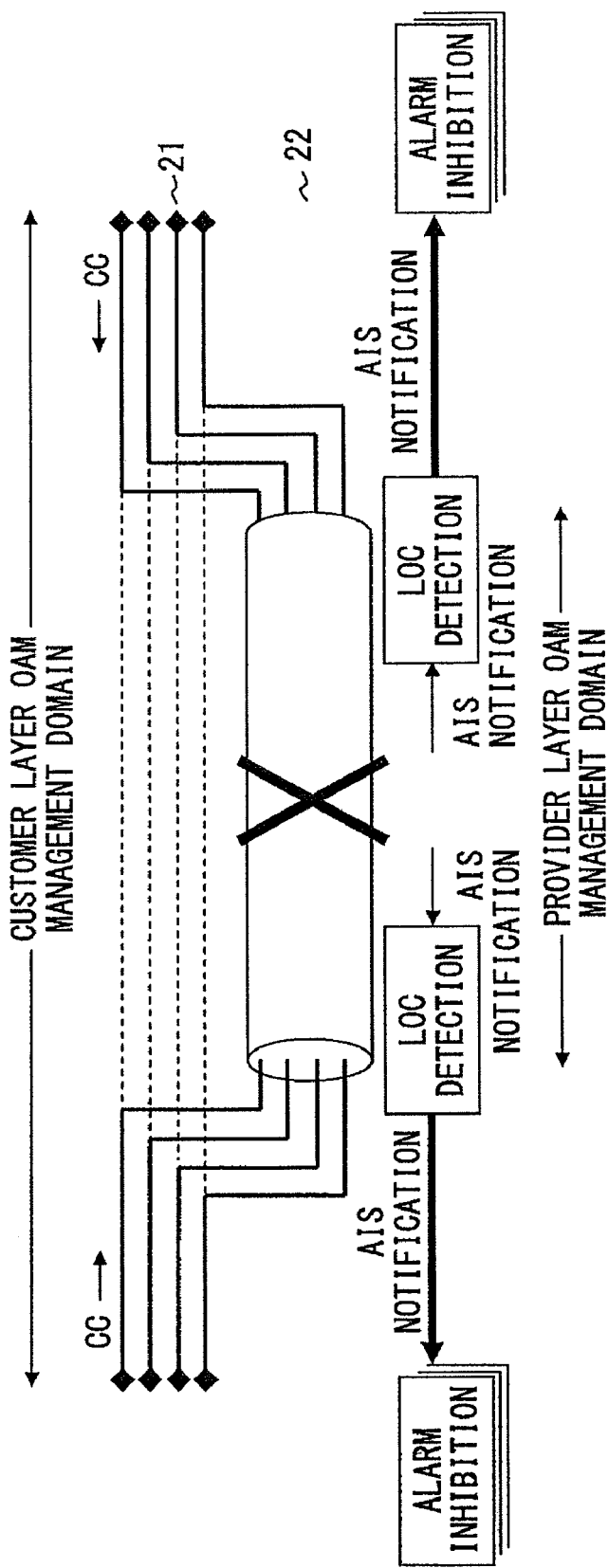
Figure 2:
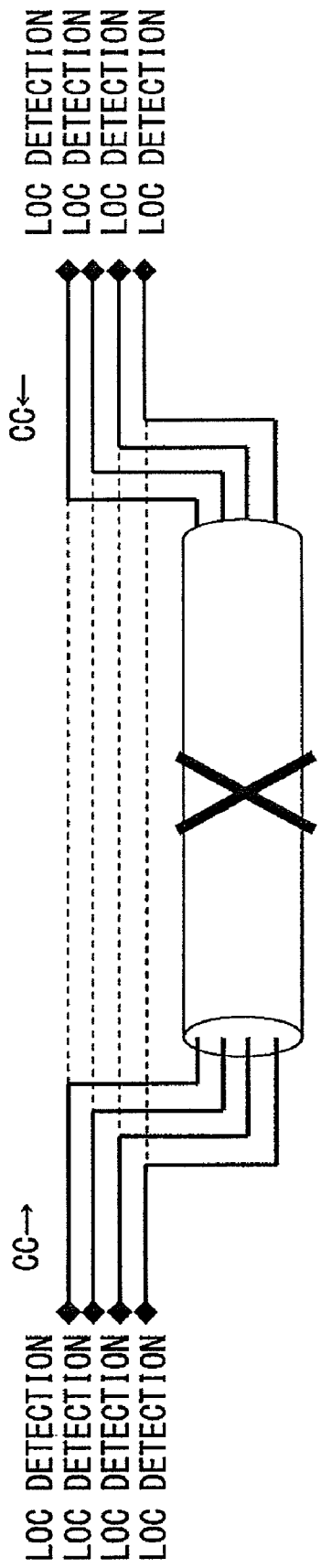
Figure 3:
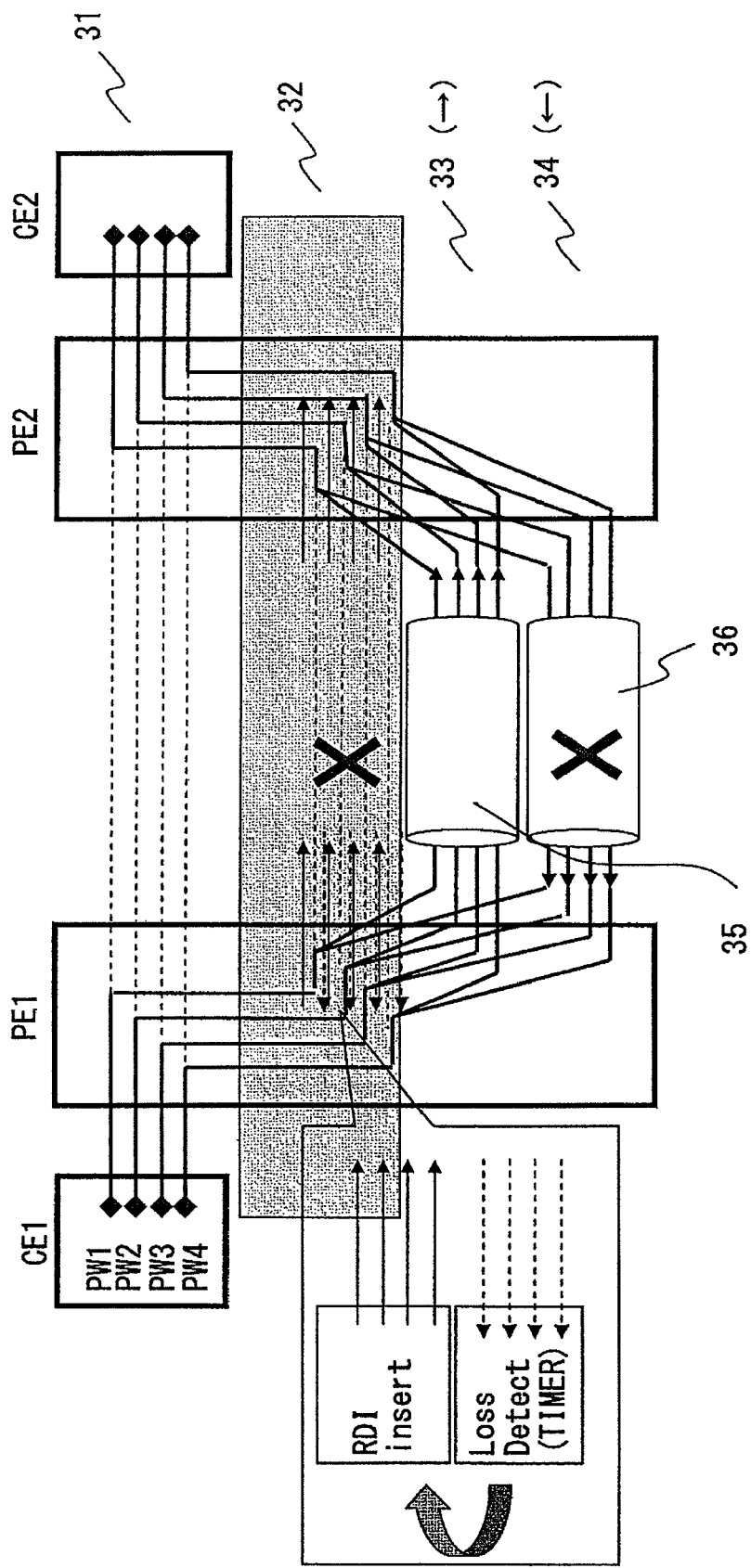
FIG. 3 illustrates a problem and is a schematic diagram of the operation in the conventional alarm processing in the case of using PW (Pseudo Wire) technology based on MPLS.
Figure 4:
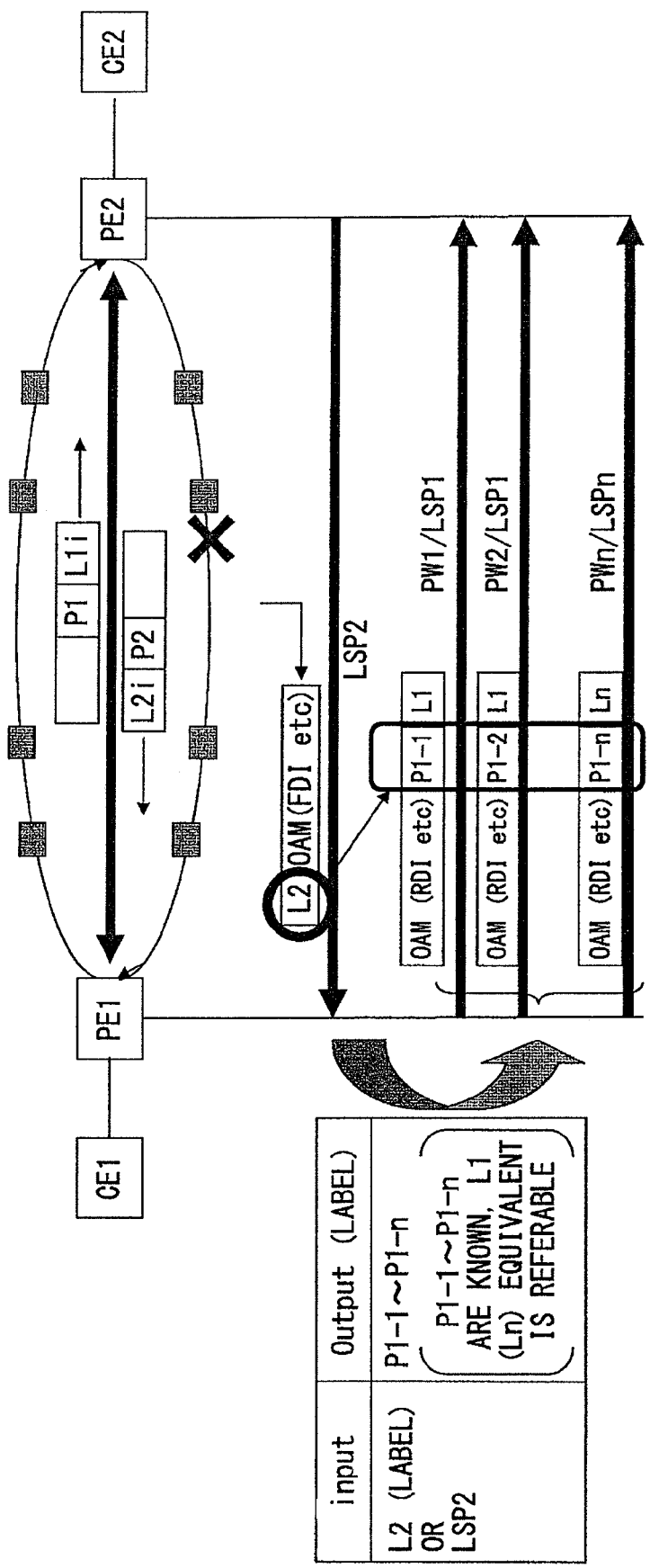
FIG. 4 is a schematic diagram illustrating the problem more specifically.

As another example, an LDP message may also be mapped as a control message directed to PW transmission from PE1 to PE2. Practically, a PW Associated Channel Header is assigned as a control word which identifies a VCCV message in a PWE3 VCCV draft (draft-ietf-pwe3-vccv-**.txt). An effect similar to OAM may be obtained also by using this header, and alarm forwarding illustrated in FIG. 4 may be allowed. The header has a packet structure which includes L2, P2, CW (control word) and an LDP message in this order.

Figure 7:
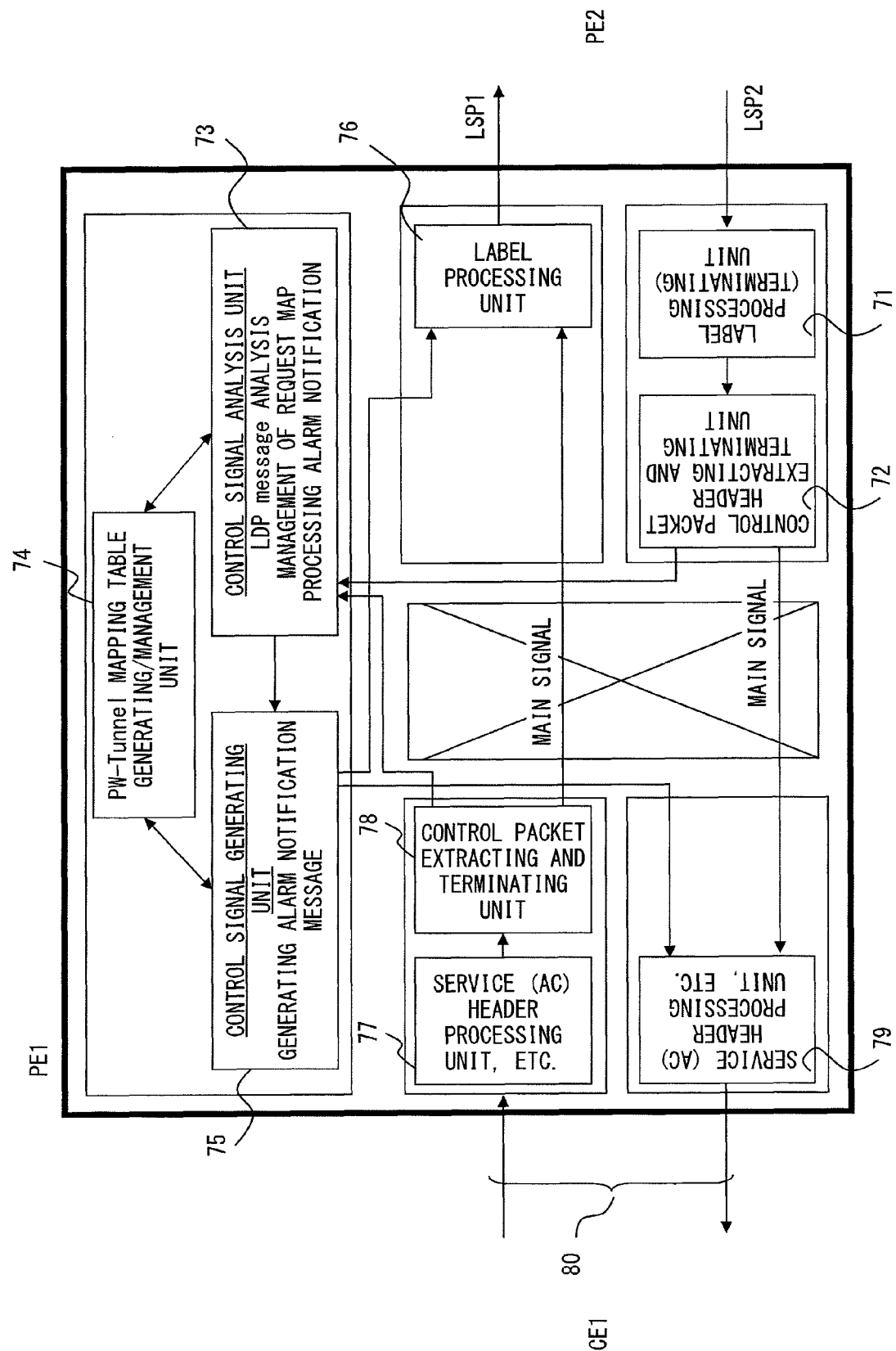
FIG. 7 is an apparatus block diagram of the first example of the present invention.

An apparatus configuration to implement this operation is illustrated in FIG. 7. Configuration of PE1 is explained as an example. In FIG. 7, data LSP2 received from PE2 is terminated at the control packet header extracting and terminating unit 72 via the label processing terminating unit 71, and then LDP message analysis is performed at the control signal analysis unit 73. Next, an alarm notification message is generated at the control signal generating unit 75 with reference to the PW-tunnel mapping table generating/management unit 74, and the alarm notification message is transmitted as LSP1 to PE2 via the label processing unit 76. Further, a signal from the attachment circuit 79 of CE1 transmits output to the control signal analysis unit 73 via the service header processing unit 77 and the control packet extracting and terminating unit 78. The service header processing unit 77 and the control packet extracting and terminating unit 78 also transmits output as a main signal to the label processing unit 76. Output from the control signal generating unit 75 and a main signal from the control packet header extracting and terminating unit 72 are transmitted to the attachment circuit 80 via the service header processing unit 79.

The operation of an example of the present invention is described more specifically with reference to FIGS. 6, 7, 8, and 9. FIG. 8 illustrates a flow of associating between services. In step S1, PW signaling (LDP) is performed on the basis of the existing RFC4447 so as to establish PW. This result is confirmed at both PEs. In step S2, PE (hereinafter PE2, with reference to FIGS. 6A, 6B, and 6C) transmits to PE1 the control packet (OAM) for LSP2* in which a payload consisting of a PW-directed label mapping message received by PE and the associated PW FEC TLV (e.g., the flow corresponds: control signal generating (not shown in FIG. 7)->label processing 71 in FIG. 7). While PE2 is considered in FIG. 6A, the same applies to PE1. Alternatively, the received PW (or those which belongs to the label) may transmit a control packet directed to PE1 (IP) instead of the above-described control packet for LSP2.

In step S3, PE1 receives the control packet. In step S4, a field* to identify the tunnel label and control packet for LSP2 is determined (corresponding to the flow in FIG. 7: label processing->control packet terminating). Then the control signal or the payload is passed to the control signal analysis unit for processing. At this time, the control signal analysis unit is also notified that the control signal is directed to LSP2. The above-described determination of the field may be performed by determining the following:

IP address for "LSP2->PW or PE1"+control packet.

In step S5, FEC analysis is performed. In step S6, it is determined whether or not the same FEC is present in the PW-tunnel mapping table generating/management (FIG. 6B). If the result is No, the operation is terminated. If the result is Yes, in step S7, the label mapping message transmitted from PE1 to PE2 is looked up and a PW label is determined. Specifically, labels P1*i~n* to identify the customer transmitted from PE1 to PE2 are looked up, and are mapped to the customer identification labels P2*j-n* received by PE1. In step S8, label information of opposite PW may be obtained in LSP2.

FIG. 9 illustrates a flow of failure detection. In step S10, an alarm about the failure in LSP2 is given. Specifically, FDI is received at PE1. The alarm is passed to the control signal analysis unit 73 via the label processing unit 71 and the control packet terminating unit 72 in FIG. 7. In step S11, with reference to the LSP information, opposite PW information (label information) is obtained from the PW-tunnel mapping table (FIG. 7) as described in FIGS. 6A, 6B, and 6C. In step S12, a BDI message corresponding to the obtained PW label (PW) is generated at the control signal generating unit 75 (FIG. 7). In step S13, the BDI message is transmitted to PE2 for each PW unit.

Example 2

In FIG. 6A, the direction of alarm forwarding is that of opposite PW, or a transmission direction outgoing from PE which receives the failure notice. However, in practice, a so-called attachment circuit (AC) 80 is present outside PW (between PE-CE) as described in FIG. 10A. An alarm forwarding using OAM (AIS, etc.) toward the CE part in this direction may also be possible. In FIG. 7, analysis is performed at the control signal analysis unit 73, and the processing result is passed to the generating unit 75. Finally, the result is reported outside via the service (AC) header processing unit 78 and the attachment circuit 80.

Example 3

Figure 10B:
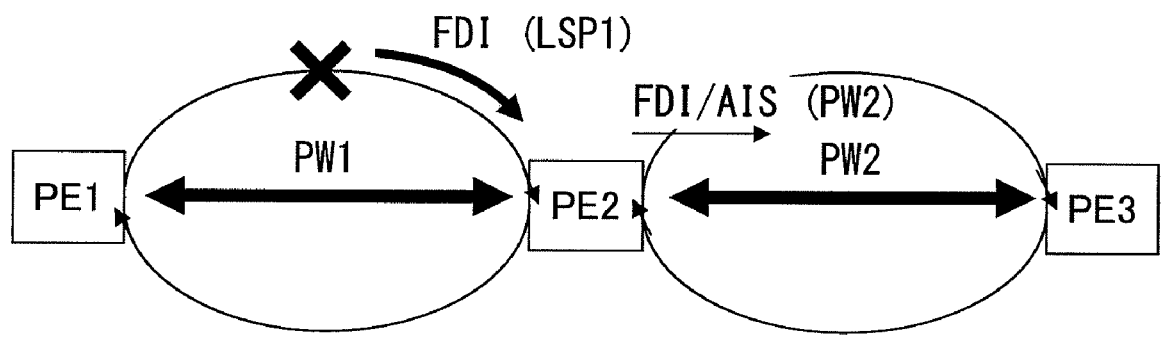
FIG. 10B is a schematic diagram of the second example of the present invention.

While embodiments of the present invention consider the case in which PW is established over one domain between PEs, if a multi-domain/multi-carrier system is considered, the case in which PW is connected in tandem between several domains is considered so that an end-to-end service is provided as described in FIG. 10B.

This embodiment of the present invention may also be applicable. When an LSP failure notice from PE1 is received at PE2, as illustrated in the embodiments of the present invention, alarm forwarding in PW1 between PE2 and PE1 as well as alarm forwarding in PW2 between PE2 and PE3 may be achieved. Specifically, when a failure is detected between PE1 and PE2, the data is transmitted to PE2 as FDI (LSP1), and is further transmitted from PE2 to PE3 as FDI/AIS via Pseudo Wire PW2. In addition, as for PE1, the failure information is transmitted from PE2 to PE1 as in the first embodiment of the present invention.

As described in FIG. 10C, the input into the L1 label or LSP1 corresponds to the output from P1-1 through P1-*n*. Data having the same message as that of the input data is looked up at PE2, and is transmitted from PE2 to PE3 with reference to the control codes of P3-1 through P3-*n* and the control code of L3. Therefore, in this case, an example is given in which a failure occurs in LSP1 established between PE1 and PE2, and this failure is reported to PE2.

In PE2, a failure in LSP1 is recognized on the basis of the received label (L1). At this time, as described in the embodiments of the present invention, information of labels of upper PWs (P1-1~P1-*n*) may be identified from information of L1. In order to switch PW labels, PE2 has switching information from P1 to P3 already in the setup stage. Therefore, when a failure occurs in LSP1, PE3 and thus CE may be notified of the failure via PW2. The same message as that transmitted from the failure to PE2 is transmitted to PE3.

Figure 11:
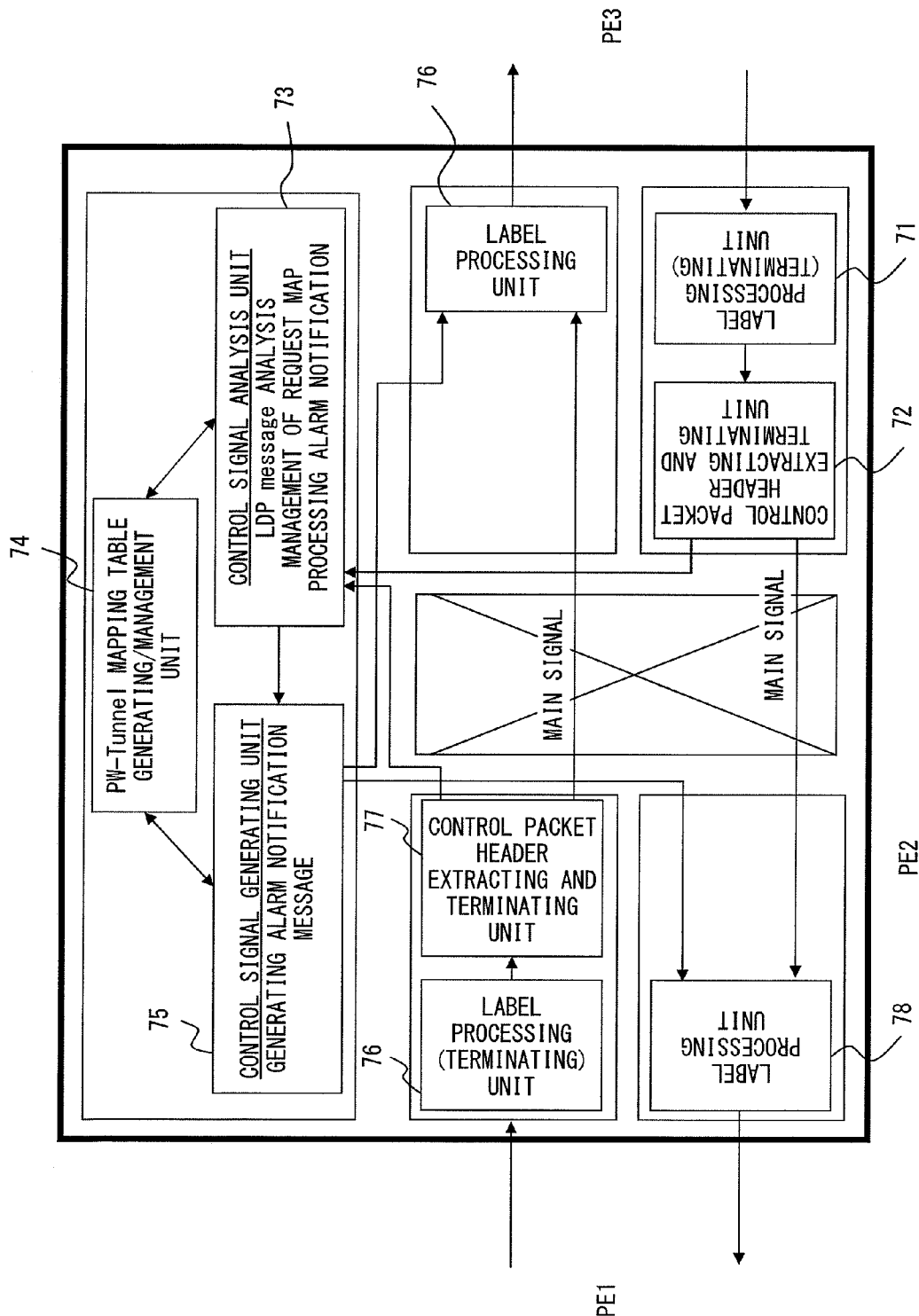
FIG. 11 is an apparatus block diagram of the third example of the present invention.

FIG. 11 illustrates a configuration diagram of the implementation. Specifically, an apparatus having the same configuration as that illustrated in FIG. 7 is provided at PE2. The data to identify the upper PW with reference to the LSP1 failure is received from PE1. Label processing and control packet header extraction are performed, and analysis of the LDP message of this data is performed in the control signal analysis unit 73. Data having the same LDP message is detected from the PW-tunnel mapping table. Then an alarm belonging to PW (P3-1~P3-n) on PE3 is generated at the control signal generating unit. After adding an alarm notification message and performing label processing, the alarm is transmitted to the third edge PE3.

The only difference from FIG. 7 is that IFs (interfaces) on both parts are PWs (MPLS). Also, the case in the opposite direction, for example the case in which PE1 receives the LSP failure notice from PE2, may be achieved with the embodiments of the present invention.

Example 4

The embodiments of the present invention, for example in the case illustrated in FIG. 6A, provide a means to identify PW (unidirectional) associated with LSP2 and to provide an alarm forwarding mechanism toward the opposite PW. Therefore, a layer which transmits in the opposite direction is a PW layer, i.e., a service individual unit. However, if all counterparts of the PWs associated with LSP2 belong to a single LSP (LSP1), alarm forwarding traffic may be reduced.

Figure 12:
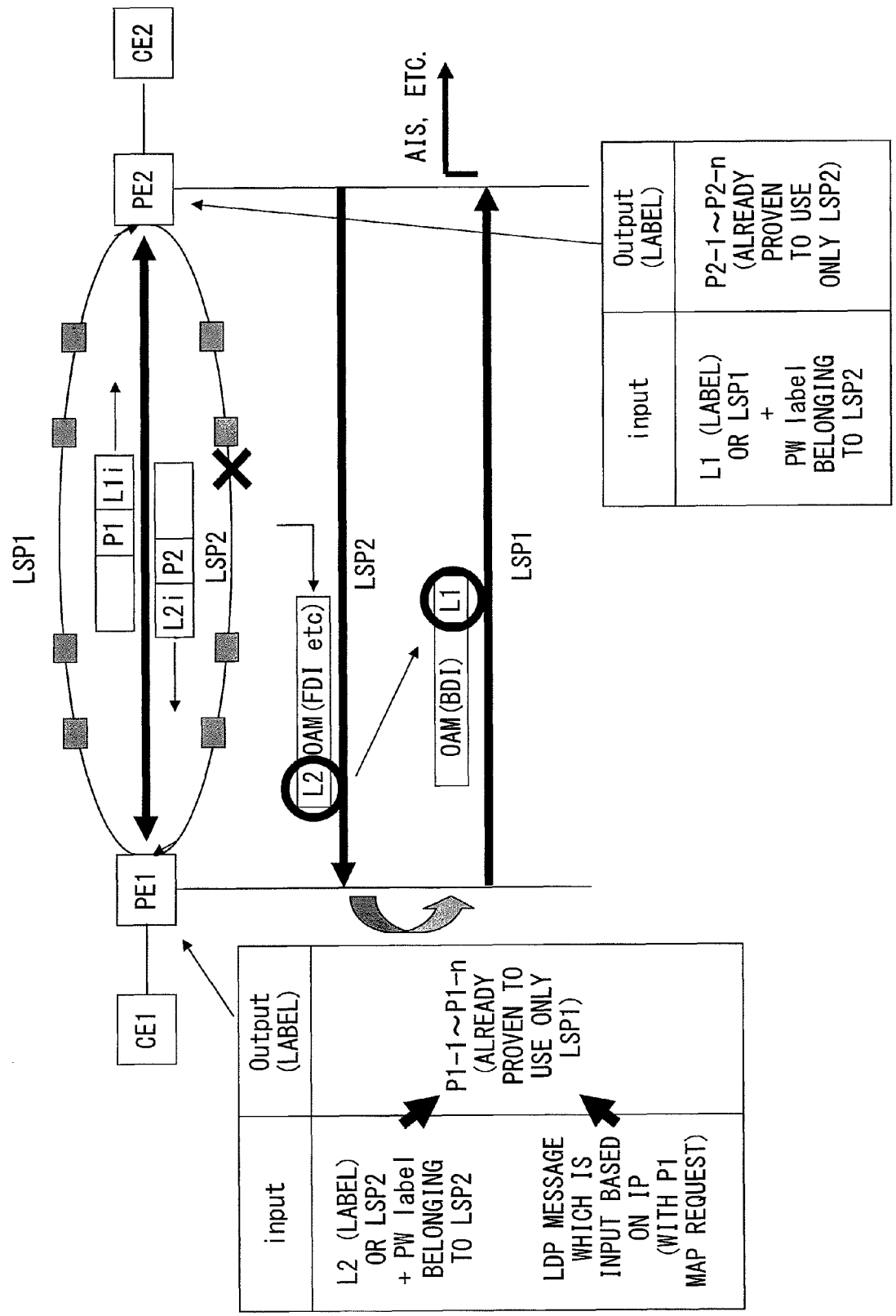
FIG. 12 is a schematic diagram of the fourth example of the present invention.

In this processing, a mechanism is required which confirms that all counterparts of the PWs associated with LSP2 belong to L1. A method to achieve such a mechanism is illustrated in FIG. 12. In PE1, as illustrated in FIG. 12, information of P1-1~P1-n is obtained from information of LSP2 or L2. Correlation between P1-i and LSP to be transmitted has already been obtained, because signaling is performed on the same node, and in transmission of a main signal, P1-i is mapped and then a tunnel label is mapped.

Under this condition, once it is found that P1-1~P1-n are mapped to a single LSP, PE1 transmits a message equivalent to a BDI (Backward Defect Indicator) in the equivalent LSP layer, instead of an RDI, which is transmitted in the PW layer.

On the receiving part, PE2, alarm forwarding processing is performed on the basis of L1. The processing illustrated in FIGS. 6A and 6B is also performed at PE2.

As described above, the embodiments of the present invention provide a management system of labels and paths applied to a communication apparatus using PW (Pseudo Wire) technology on the basis of MPLS. This allows an LOC function from the lower layers (below MPLS) to be reported (escalated) to PW by providing a function having a correlation between MPLS layers and PW layers, and is characterized by its efficient failure notification.

Consequently, an alarm inhibition function may be achieved and high-efficiency failure notification may be allowed, and thus management efficiency may be increased.

What is claimed is:

1. A communication system which is a transmission system using MPLS (Multi Protocol Label Switching) tunneling and label technology to map a communication service to the MPLS, thereby providing bidirectional services on an end-to-end basis, comprising:
a provider edge router to perform label assignment control for the bidirectional services;
to transmit, after completion of the assignment control, a second message in which a first message used in the assignment control is a payload and a tunnel-directed label used by the bidirectional services is a header;
to associate, on the basis of the received first message used in the assignment control, a service-directed label included in the corresponding first message with the received tunnel-directed label, in the part where the second message is terminated;
to analyze the first message to determine the presence of a message having the same forwarding attribute in the label assignment; and
to obtain correspondence between a label which identifies a customer service transmitted from a first end to a second end and a label which identifies a customer service transmitted from the second end to the first end, when the determination is achieved.

2. The communication system according to claim 1, wherein the header of the first message includes a specific label for control management.

3. The communication system according to claim 1, wherein the header of the first message includes a specific data field for control management.

4. The communication system according to claim 1, wherein the header of the first message includes IP and UDP.

5. The communication system according to any of claim 1, wherein when receiving a failure notification message in which a tunnel-directed label used by a service is a header, a service-directed label in the opposite direction is obtained, and a payload associated with the obtained service-directed label reflects that a service using a tunnel to which the received failure notification message belongs is in a disconnection state.

6. The communication system according to any of claim 1, wherein when receiving a failure notification message in which a tunnel-directed label used by a service is a header, a corresponding service-directed label or a service identification is obtained from the header, and a user is notified of a disconnection state of the service.

7. The communication system according to any of claim 1 which is a failure notification system at an MPLS path endpoint and a connecting point in a transmission system, wherein:
the transmission system connects paths in tandem formed by mapping to MPLS and provides bidirectional services on an end-to-end basis; and
when the MPLS path endpoint and the connecting point receive the failure notification message in which a tunnel-directed label used by a customer service is a header, a service-directed label in a forward direction is obtained from the header, and a disconnection state of the service is reflected in a payload associated with the obtained service-directed label.

8. The communication system according to any of claim 1, wherein when the means to associate, on the basis of the received message used in the assignment control, associates the service-directed label included in the corresponding message with the received tunnel-directed label, if it is determined that all service-directed labels included in the corresponding message are present in a single tunnel which hold an opposite service, the tunnel is notified that a service using a tunnel to which the received failure notification message belongs is in a disconnection state.

9. A provider edge router which is used in a transmission system using MPLS (Multi Protocol Label Switching) tunneling and label technology to map a communication service to the MPLS, thereby providing bidirectional services on an end-to-end basis, comprising:
a label assignment controller for the bidirectional services;

a receiving unit for receiving, after completion of an assignment control, a second message in which a first message used in the assignment control is a payload and a tunnel-directed label used by the bidirectional services is a header;

a service-directed labeler to associate, on the basis of the first message, a service-directed label included in the first message with the tunnel-directed label;

an analyzer for determining in the first message a presence of a message having the same forwarding attribute in a label assignment; and a correlator for determining correspondence between a label which identifies a customer service transmitted from a first end to a second end and a label which identifies a customer service transmitted from the second end to the first end, when a determination is achieved.

10. The provider edge router according to claim 9, wherein the header of the first message includes a specific label for control management.

11. The provider edge router according to claim 9, wherein the header of the first message includes a specific data field for control management.

12. The provider edge router according to claim 9, wherein the header of the first message includes IP and UDP.

13. The provider edge router according to claim 9, wherein when receiving a failure notification message in which a tunnel-directed label used by a service is a header, a service-directed label in the opposite direction is obtained, and a payload associated with the obtained service-directed label reflects that a service using a tunnel to which the received failure notification message belongs is in a disconnection state.

14. The provider edge router according claim 9, wherein when receiving a failure notification message in which a tunnel-directed label used by a service is a header, a corresponding service-directed label or a service identification is obtained from the header, and a user is notified of a disconnection state of the service.

15. The provider edge router according to claim 9, wherein the edge router is a failure notification apparatus at an MPLS path endpoint and a connecting point in a transmission apparatus, wherein:

the transmission apparatus connects paths in tandem formed by mapping to MPLS and provides bidirectional services on an end-to-end basis; and when the MPLS path endpoint and the connecting point receive the failure notification message in which a tunnel-directed label used by a customer service is a header, a service-directed label in a forward direction is obtained from the header, and a disconnection state of the service is reflected in a payload associated with the obtained service-directed label.

* * * * *